US008970758B2

(12) United States Patent
Yamashita

(10) Patent No.: US 8,970,758 B2
(45) Date of Patent: Mar. 3, 2015

(54) IMAGE PICKUP DEVICE AND SIGNAL PROCESSING METHOD THEREOF

(71) Applicant: Canon Kabushiki Kaisha, Tokyo (JP)

(72) Inventor: Yuichiro Yamashita, Ebina (JP)

(73) Assignee: Canon Kabushiki Kaisha, Tokyo (JP)

( * ) Notice: Subject to any disclaimer, the term of this patent is extended or adjusted under 35 U.S.C. 154(b) by 26 days.

(21) Appl. No.: 13/871,781

(22) Filed: Apr. 26, 2013

(65) Prior Publication Data

US 2013/0235244 A1    Sep. 12, 2013

Related U.S. Application Data

(62) Division of application No. 13/418,722, filed on Mar. 13, 2012, now Pat. No. 8,451,361, which is a division of application No. 12/303,259, filed as application No. PCT/JP2007/062361 on Jun. 13, 2007, now Pat. No. 8,169,498.

(30) Foreign Application Priority Data

Jun. 16, 2006    (JP) .................................. 2006-167750

(51) Int. Cl.
*H04N 3/14*    (2006.01)
*H04N 5/225*    (2006.01)
(Continued)

(52) U.S. Cl.
CPC ............. *H04N 5/3745* (2013.01); *H04N 5/357* (2013.01); *H04N 5/378* (2013.01)
USPC ........ 348/308; 348/294; 348/222.1; 348/341; 348/229.1; 341/144; 341/155; 341/126; 341/118; 250/208.1

(58) Field of Classification Search
USPC .............. 348/308, 294, 241, 222.1, 572–573, 348/229.1; 341/144, 155, 126, 118, 120, 341/139, 161–163, 172, 110; 250/208.1
See application file for complete search history.

(56) References Cited

U.S. PATENT DOCUMENTS 5,164,726 A * 11/1992 Bernstein et al. ............. 341/120
5,198,816 A *  3/1993 Kalinowski et al. .......... 341/137
(Continued)

FOREIGN PATENT DOCUMENTS

EP          798864 A1    10/1997
EP         0798864 A1 * 10/1997 ............ H03M 11/38
(Continued)

OTHER PUBLICATIONS

Notification of the First Office Action issued by the European Patent Office dated Oct. 1, 2013, in connection with counterpart European Appl'n. No. 07 745 528.5.
(Continued)

*Primary Examiner* — Tuan Ho
*Assistant Examiner* — Marly Camargo
(74) *Attorney, Agent, or Firm* — Fitzpatrick, Cella, Harper & Scinto

(57) ABSTRACT

An image pickup device is provided, capable of complete correction with data of once analog-to-digital conversion, and prevention of excess use of switches and analog devices and/or erroneous correction, including: an image sensor having a plurality of analog-to-digital converters determining conversion results from a digital signal of higher order bit through separate steps of two or more times; a first correction unit which has a correction factor for correcting nonlinear errors of the plurality of analog-to-digital converters so as to adapt to the analog-to-digital converters and corrects a nonlinear error of a digital signal output from respective analog-to-digital converters based on a correction factor corresponding to respective analog-to-digital converters, characterized in that the first correction unit corrects the nonlinear errors after converting the digital signals from the plurality of analog-to-digital converters into a serial output.

16 Claims, 14 Drawing Sheets

(51) Int. Cl.
*H03M 1/66* (2006.01)
*H01L 27/00* (2006.01)
*H04N 5/3745* (2011.01)
*H04N 5/357* (2011.01)
*H04N 5/378* (2011.01)

(56) References Cited

U.S. PATENT DOCUMENTS

| | | | |
|---|---|---|---|
| 5,982,318 A | 11/1999 | Yiannoulos | 341/155 |
| 6,115,066 A | 9/2000 | Gowda et al. | 348/308 |
| 6,137,432 A | 10/2000 | Xiao | 341/169 |
| 6,831,686 B1 * | 12/2004 | Koren et al. | 348/243 |
| 7,522,199 B2 * | 4/2009 | Funakoshi et al. | 348/245 |
| 7,920,196 B2 * | 4/2011 | Nakamura | 348/308 |
| 8,169,498 B2 * | 5/2012 | Yamashita | 348/222.1 |
| 8,451,361 B2 * | 5/2013 | Yamashita | 348/308 |
| 2003/0202111 A1 * | 10/2003 | Park | 348/243 |
| 2006/0001753 A1 | 1/2006 | Funakoshi et al. | 348/308 |
| 2006/0092287 A1 | 5/2006 | Hara et al. | 348/222.1 |
| 2007/0046795 A1 | 3/2007 | Yamashita | 348/294 |
| 2008/0036890 A1 | 2/2008 | Yamashita et al. | 348/308 |
| 2009/0009372 A1 | 1/2009 | Yamashita | 341/122 |
| 2009/0096647 A1 | 4/2009 | Nazemi | 341/122 |
| 2009/0237545 A1 | 9/2009 | Nakamura et al. | 348/308 |

FOREIGN PATENT DOCUMENTS

| | | |
|---|---|---|
| EP | 1653728 A1 | 5/2006 |
| JP | 2002-281343 A | 9/2002 |
| JP | 2005-210480 A | 8/2005 |
| JP | 2005-236630 A | 9/2005 |
| JP | 2006-025189 A | 1/2006 |
| JP | 2006-135423 A | 5/2006 |
| WO | WO 02/45414 A1 | 6/2002 |

OTHER PUBLICATIONS

European Search Report issued by the European Patent Office dated Oct. 4, 2013, in connection with counterpart European Appl'n. No. 11168649.9.

European Search Report issued by the European Patent Office dated Oct. 1, 2013, in connection with counterpart European Appl'n. No. 07 745 528.5.

* cited by examiner

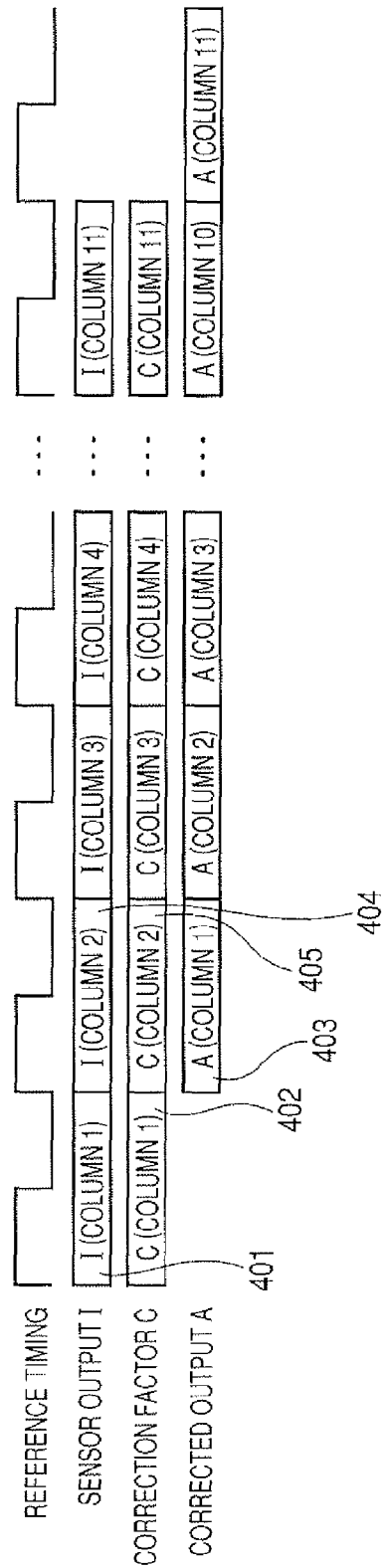

Prior Art

IMAGE PICKUP DEVICE AND SIGNAL PROCESSING METHOD THEREOF

CROSS REFERENCE TO RELATED APPLICATIONS

This application is a division of U.S. Application No. 13/418,722, filed Mar. 13, 2012, which is a division of U.S. Application No. 12/303,259, filed Dec. 3, 2008, now U.S. Pat. No. 8,169,498, issued May 1, 2012, which is a National Stage filing under 35 U.S.C. §371 of International Application No. PCT/JP2007/062361, filed Jun. 13, 2007. The entire disclosures of these prior applications are incorporated herein by reference.

TECHNICAL FIELD

The present invention relates to an image pickup device and a signal processing method thereof.

BACKGROUND ART

Some CMOS image sensors have analog-to-digital converters in parallel to each other in a column to read signals from the sensors at a high speed. Such analog-to-digital converters arranged in parallel in a column are referred to as a "column ADC".

FIG. 15 is a schematic diagram of I/O characteristics of an analog-to-digital converter. Where the precision of an analog circuit is as ideal during amplification, a straight line is shown as indicated by 1501. In the case where a deviation is made from the ideal line as indicated by dashed lines 1502, a digital code (an erroneous code) which will not appear even if any analog data is input occurs.

As an example of a prior art against the problem, Japanese Patent Application Laid-Open No. 2006-025189 discusses an image sensor that has a circulation type of analog-to-digital converter for each column thereof and performs analog-to-digital conversion twice to reduce errors due to variations in capacitance used in the circulation type of analog-to-digital converter. The image sensor disclosed in Japanese Patent Application Laid-Open No. 2006-025189 performs analog-to-digital conversion twice while switching capacitances used in a circuit thereof and retains the converted data in a register for averaging and output.

Japanese Patent Application Laid-Open No. 2005-210480 discusses an imaging apparatus having a plurality of analog-to-digital converters that corrects output signals of the analog-to-digital converters according to a reference signal of a reference signal generating unit of generating the reference signal.

[Patent Document 1] Japanese Patent Application Laid-Open No. 2006-025189

[Patent Document 2] Japanese Patent Application Laid-Open No. 2005-210480

However, correction according to a method being discussed in Japanese Patent Application Laid-Open No. 2006-025189 has the following three problems: The first is that analog-to-digital conversion is always required twice, which causes, in principle, a conversion speed to be lowered to ½. This problem is fatal to digital camera application requiring high-speed shutter and moving image application.

The second is that excess wiring, capacitance and switch must be arranged to switch circuitry connection. A column ADC must be laid out in almost the same width or at a maximum several times as wide as pixels of the image sensor and an increase in the number/volume of wirings, capacitance or switches will impair pixel size reduction or cause characteristic degradation.

The third is that correction is not complete. FIG. 16 is a graph illustrating a relationship between an analog input and a digital output for describing a principle thereof. By twice converting an analog-to-digital conversion characteristic indicated by alternate long and short dashed lines of 1601 and an analog-to-digital conversion characteristic indicated by dashed lines of 1602, averaging is performed, thus an ideal analog-to-digital conversion characteristic is achieved as indicated by a solid line of 1603.

For example, at a point A of 1604, the twice-conversion yields conversion results as seen from 1605 and 1606 deviated from an ideal value twice for the same analog value. By averaging the conversion results, an ideal characteristic as seen from 1607 can be achieved. However, when an analog value corresponding to a value where discontinuity of a digital output is large as indicated by a point B of 1608 enters, twice-conversion results as indicated by 1609 and 1610 will form an ideal characteristic. However, if conversion result as indicated by 1611 is obtained in place of 1610 by external disturbance due to random noise of pixels or a read-out circuit or the like, averaging will not make the obtained result meet the ideal characteristic, resulting in a correction error.

The imaging apparatus being discussed in Japanese Patent Application Laid-Open No. 2005-210480 requires one correction unit for each analog-to-digital converter. That is, a lookup table is used. The lookup table varies with individual analog-to-digital converters, which makes it difficult to realize commonality for a plurality of analog-to-digital converters.

Sensors arranged with pixels in a two-dimensional form generally produces outputs from a plurality of signal wires, finally, by multiplexing or serializing. Furthermore, in the case of a sensor having many analog-to-digital converters like a column ADC, a correction circuit is provided for each analog-to-digital converter at a previous stage at which an output is multiplexed. Accordingly, as the number of the analog-to-digital converters increases, such a sensor is difficult to apply for practical use. In particular, where a pixel region arranged with a plurality of pixels including photoelectric transfer elements and a reading unit including analog-to-digital converters are disposed on an identical semiconductor substrate, restriction on layout of elements is strict and, in some cases, an extreme increase in circuit scale causes a particular problem due to the increased number of correction circuits.

The present invention, implemented to solve at least one of the foregoing problems, is provided for the objects of complete correction with data of once analog-to-digital conversion, as much elimination of excessive use of switches, analog elements or the like as possible, and/or prevention of erroneous correction.

DISCLOSURE OF THE INVENTION

To attain the aforementioned objects, according to the present invention, an image pickup device comprises: an image sensor having a plurality of analog-to-digital converters determining conversion results from a digital signal of higher order bit through separate steps of two or more times; a first correction unit which has a correction factor for correcting nonlinear errors of the plurality of analog-to-digital converters so as to adapt to the analog-to-digital converters and corrects a nonlinear error of a digital signal output from respective analog-to-digital converters based on a correction factor corresponding to respective analog-to-digital converters, characterized in that the first correction unit corrects the nonlinear errors after converting the digital signals from the plurality of analog-to-digital converters into a serial output.

According to the present invention, an image pickup device comprises: a pixel region arranged with photoelectric transfer elements in a two-dimensional form; an image sensor having a plurality of analog-to-digital converters converting analog signals from pixels and determining conversion results from digital signals of higher order bit through separate steps of two or more times, the pixel region and the plurality of analog-to-digital converters being arranged on an identical semiconductor substrate; and a correction unit which has a correction factor for correcting nonlinear errors of the plurality of analog-to-digital converters so as to adapt to the analog-to-digital converters and corrects a nonlinear error of digital signals output from respective analog-to-digital converters based on the correction factor adapting to respective analog-to-digital converters.

According to the present invention, a signal processing method for an image pickup device having a plurality of analog-to-digital converters converting analog signals from pixels and determining conversion results from digital signals of higher order bit through separate steps of two or more times, characterized in that the nonlinear errors of the analog-to-digital converters are corrected after digital signals from the plurality of analog-to-digital converters are converted into serial outputs for correction of the nonlinear errors.

Other features and advantages of the present invention will be apparent from the following description taken in conjunction with the accompanying drawings, in which like reference characters designate the same or similar parts throughout the figures thereof.

BRIEF DESCRIPTION OF THE DRAWING

FIG. 4 is a timing chart illustrating operation of the circuit in FIG. 3;

The accompanying drawings, which are incorporated in and constitute a part of the specification, illustrate embodiments of the invention and, together with the description, serve to explain the principles of the invention.

Best Modes For Carrying Out The Invention (First Embodiment)

Figure 1A:
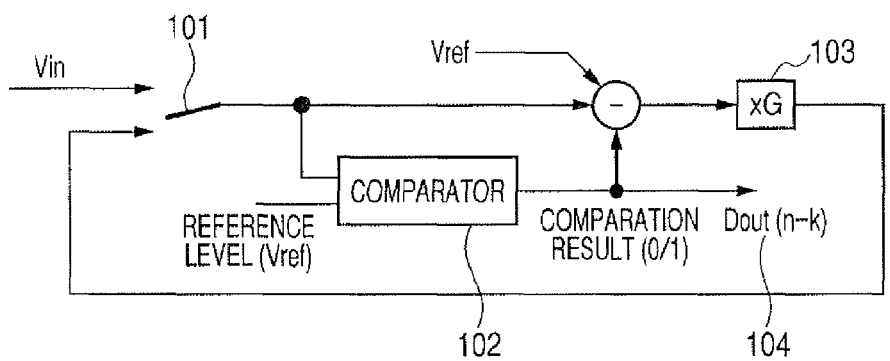
FIGS. 1A and 1B are views illustrating an analog-to-digital converter according to a first embodiment of the present invention.
Figure 1B:
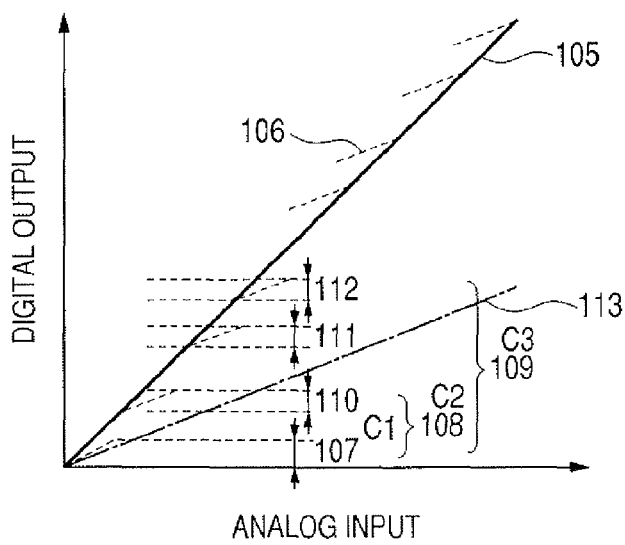
Figure 2:
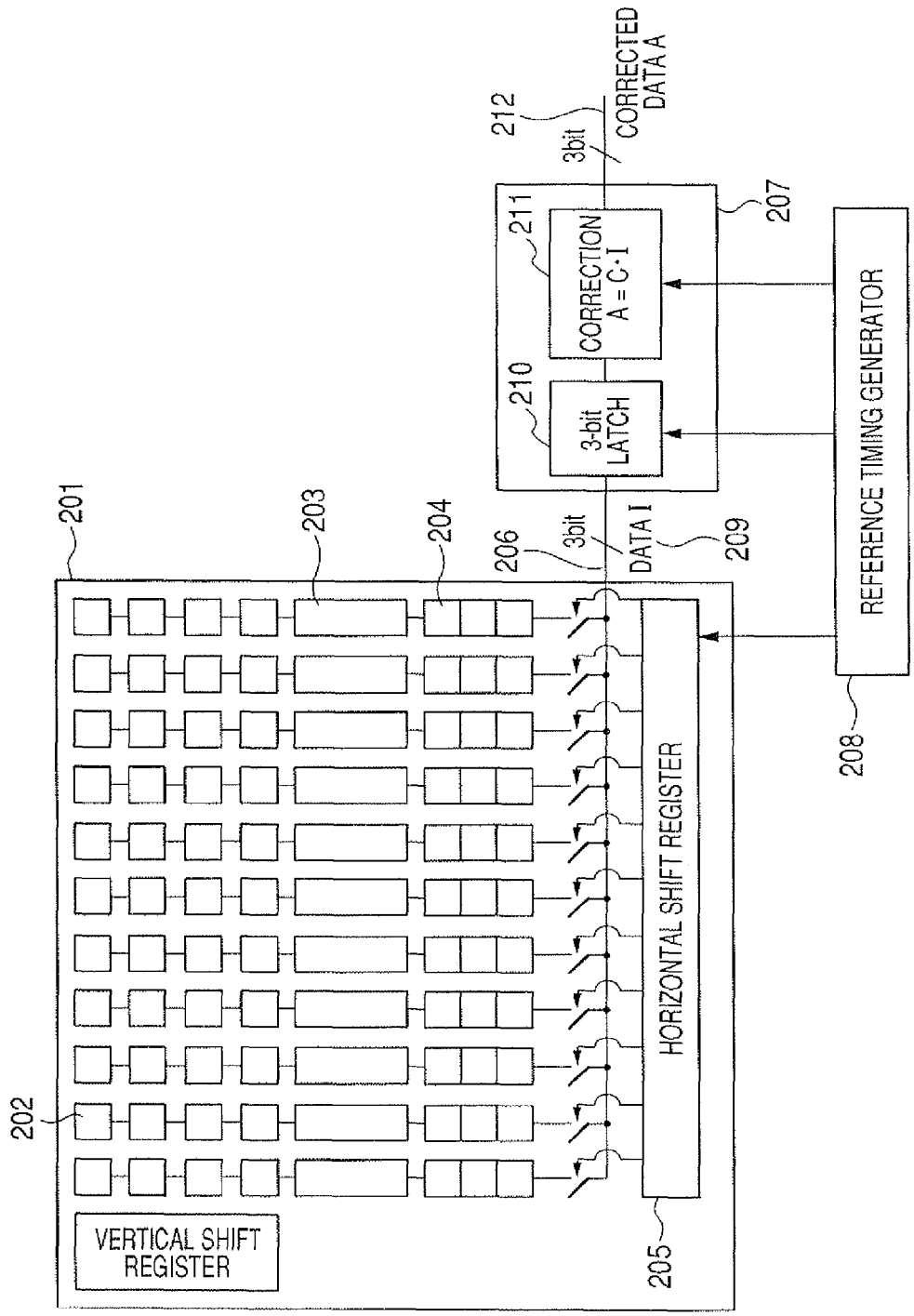
FIG. 2 is a view illustrating a configurational example of an image pickup device according to the first embodiment of the present invention.

FIGS. 1A, 1B and 2 are a view illustrating an analog-to-digital converter according to a first embodiment of the present invention, respectively. FIG. 1A is a circuit block diagram illustrating a configurational example of a circulation type of an analog-to-digital converter (ADC) used for a column ADC. FIG. 1B illustrates an example of I/O characteristics of ADC with digital outputs Dout corresponding to analog inputs Vin plotted. I/O characteristics are illustrated by a continuous line for description. 3-bit is estimated herein, and it is assumed that a digital value of 3-bit precision quantized for a specific analog value is obtained. It is actually rare that correction is necessary for 3-bit AD conversion, which is a assumption for simplifying a drawing, so as to make a simplified description.

A signal Vin from a pixel input into an input terminal 101 is compared with a reference level Vref by a comparator 102 and the comparison result becomes a digital code. When the comparison result is zero, it is left as it is. On the other hand, when the comparison result is 1, a reference level Vref is subtracted from an input signal, the signal is voltage-amplified by a gain G of an amplifier 103 and returned to an input terminal 101 again. When the bit precision of the AD converter is of n-bit, this comparison is performed n-time and the kth comparison result is output from an output terminal 104 as (n-k)th bit. As described above, this ADC divides steps into two or more times, determines a conversion result from digital signals of higher order bit, and converts analog signals into digital signals.

When a gain of an amplifier 103 is exactly 2, an ideal I/O characteristic can be obtained as indicated by 105, however, if the gain is smaller than 2, for example, 1.95, an erroneous code occurs in areas as indicated by dashed lines of characteristic 106.

As a correction factor, the magnitudes of digital codes indicated as C1, C2, C3 at I/O characteristics 107 to 109 are extracted from a real device and a correction factor vector C=(C3, C2, C1) of digital values are prepared for. The correction factor vector used herein is different from a corresponding data of an actual output value relative to an ideal reference voltage input as discussed in Japanese Patent Application Laid-Open No. 2005-210480. The correction factor vector is an aggregate of the quantity of features with the characteristic of the AD converter indicated by values of several tens at the most.

Reference character C2 is the sum of characteristics 107 and 110 and reference character C3 is the sum of characteristics 107, 110, 111 and 112. If AD conversion is performed with n-bit precision, a vector constituted of elements the quantity of which is "n" is retained as a correction factor by extending this concept. Where, values of C3, C2 and C1 depend upon a value of a gain of the amplifier 103. The correction factors C1, C2 and C3 are correction factors for correcting differential nonlinear errors of ADC. These correction factors can be acquired only by AD converting a real device at least two more times.

The imaging apparatus being discussed in Japanese Patent Application Laid-Open No. 2005-210480 is directly affected by absolute precision of digital-to-analog converters (DAC) generating reference voltages. This is because correction is performed on the concept that the absolute precision of the analog-to-digital converters is matched with that of DAC. Accordingly, for example, when an analog-to-digital converter of high bit such as 14 bits is adopted, DAC also requires 14-bit precision. Installation of such a high-precision DAC not used for actual operation in a sensor or a system would cause a significant cost rise. On the contrary, the image pickup device according to the present invention performs correction on the concept that nonlinear errors are eliminated without need of focusing on absolute precision and acquires the correction factor as a vector value. Accordingly, such a DAC having high absolute precision is not required.

A method for acquiring correction factors according to the present invention requires only AD conversion at least twice and takes only about 10 μs. Accordingly, correction factors can be acquired again during a vertical blanking period, a vertical OB reading period or high-speed photographing, thus realizing re-correction during the operation.

On the contrary, the configuration of the imaging apparatus being discussed in Japanese Patent Application Laid-Open No. 2005-210480 takes long time to determine a correction factor. In realizing AD conversion of 14-bit precision, for example, if AD conversion takes about 5 μs, 5 μs×2$^{14}$, in short, 81 ms is spent in acquiring a correction factor. In calculating a correction factor during the operation, the correction factor acquirement time of about 100 ms is required, which makes it difficult to realize high-speed photographing of ordinary moving images or still images.

FIG. 2 is a view illustrating an example of an image pickup device including a CMOS sensor 201 having a column ADC according to one embodiment and a digital signal processing unit 207. It is described below how the correction factor obtained in the above way is used for the image pickup device illustrated in FIG. 2. Reference numeral 201 denotes a CMOS image sensor and reference numeral 202 denotes pixels arranged in a columnar form. Each of the pixels 202 has a photoelectric transfer element and the photoelectric transfer generates analog pixel signals. Such pixels are arranged in a two-dimensional form, which constitutes a pixel region. The image sensor 201 has ADC203 for each column. The each column has an ADC203 illustrated in FIG. 2 and a 3-bit memory 204 storing data output from the ADC in the order of higher order bit. The data stored in the 3-bit memory is sequentially output to a 3-bit terminal 206 according to an instruction from a horizontal shift register 205. The pixel region and ADC are disposed on a identical semiconductor substrate. Reference numeral 207 denotes a digital signal processing unit and reference numeral 208 denotes a reference timing generator. The horizontal shift register 205, receiving a clock from the reference timing generator 208, outputs a 3-bit digital signal I to the digital signal processing unit 207 as indicated by reference numeral 209. The digital signal processing unit 207 latches a digital signal I from the sensor 201 with a 3-bit latch 210 based on a reference timing pulse, performs correction with a correction unit 211 and outputs the corrected data A to an output terminal 212.

The correction unit 211 performs calculation of an inner product of an output data I from the CMOS sensor 201 and a correction factor C stored in advance to correct a differential nonlinear error for the output data I of the CMOS sensor 201. This makes I/O characteristics after correction draw a straight line as indicated by a reference numeral 113 in FIG. 1B, so that a differential nonlinear error is corrected. In taking the inner product, each bit of an output data is taken as each element. For example, if I is 3-bit, it is thought to be a vector formed out of 3 elements, each of which is 1-bit of 0 or 1. The imaging apparatus being discussed in Japanese Patent Application Laid-Open No. 2005-210480 requires correction before multiplexing, therefore, the correction circuit is disposed on an identical chip to analog-to-digital converters. On the other hand, the image pickup device according to the present invention can perform correction for an output after multiplexing, which enables the correction circuit to be disposed on a chip different from a photoelectric transfer region and a readout portion including analog-to-digital converters.

The capacity of a correction factor memory required for correction is 256 bits per column, which can be saved to about 1/1,000 times as large as a conventional type. Assuming that a column ADCs has 3,000 columns, 0.8 mega bits are obtained. Even if a request for storage in a chip is made, the request can be significantly met.

On the other hand, in the imaging apparatus being discussed in Japanese Patent Application Laid-Open No. 2005-210480, for example, including a column ADC in the sensor having 3,000 columns, it is assumed that a correction unit is provided for each column. Moreover, it is assumed that precision of analog-to-digital converters per column is 14 bits. At that time, the memory size of a correction unit which one analog-to-digital converter has is about 230 k bits. In the case of analog-to-digital converters one column of which is, for example, 5 μm in width, a memory having a size of 230 k bits not negligible must be arranged at each column at intervals of 5 μm. Moreover, a total of memory capacity required by an internal chip becomes 0.69 G bits and requires a considerable area. Accordingly, the image pickup device according to the present invention is effective, in particular, to a case where a pixel region and ADCs are disposed on an identical semiconductor substrate.

A clock generated by the reference timing generator 208 makes the sensor 201 and the digital signal processing unit 207 synchronously operate with each other, thus providing correction without causing any error.

The advantages of this embodiment are as follows: First, there is no need of switching circuit connection twice for conversion of signals of a sensor like the image sensor being discussed in Japanese Patent Application Laid-Open No. 2006-025189. As a result, conversion speed becomes higher, in principle, twice.

Re-changing of circuit connection eliminates need of AD conversion, thus further simplifying the layout and reducing pixel pitch and layout area.

In the image sensor being discussed in Japanese Patent Application Laid-Open No. 2006-025189, no correction exists due to effect of random noise, however, this embodiment corrects discontinuity even in the presence of noise, thus performing highly precise conversion.

In this embodiment, the CMOS image sensor 201, the digital signal processing unit 207, and the reference timing generator 208 are described as separated from each other, but are not limited to this form. For example, the CMOS image sensor 201 and the digital signal processing unit 207 may be disposed on an identical substrate, or may be arranged on a multi-chip package. This is obvious because advantages of this embodiment is not affected by the embodiment itself.

Calculation for correction may be completed with 1-reference clock, or with a numerical clock by pipeline processing. In use of pipeline processing, a pipeline delay occurs, but there is no problem in practical use.

Description of the correction operation of this embodiment is strictly an example. The essence of this embodiment is to perform higher speed read by correcting a column ADC at the same speed as a rate of a pixel output from the sensor based on a correction factor extracted from an analog-to-digital converter itself. It is obvious that even with any correction other than the concept that correction can be performed by internal product like this embodiment the advantages of this embodiment can be obtained. ADC may be provided for each column, or a common ADC may be provided for a plurality of columns. This embodiment has at least a plurality of analog-to-digital converters. It is important to correct a differential nonlinear error with a correction factor corresponding to respective analog-to-digital converters.

(Second Embodiment)

As described above, the column ADC is laid out in the same width or at a maximum several times as wide as the pixel. This makes it difficult to ensure local precision of an analog element. Variations in the local precision at each column causes variations in gain of the amplifier 103 according to a first embodiment at each column, and use of the same correction factor would not ensure precision after correction. Accordingly, it is necessary to prepare correction factors for each column and perform correction with unique correction factors for each column ADC.

Figure 3:
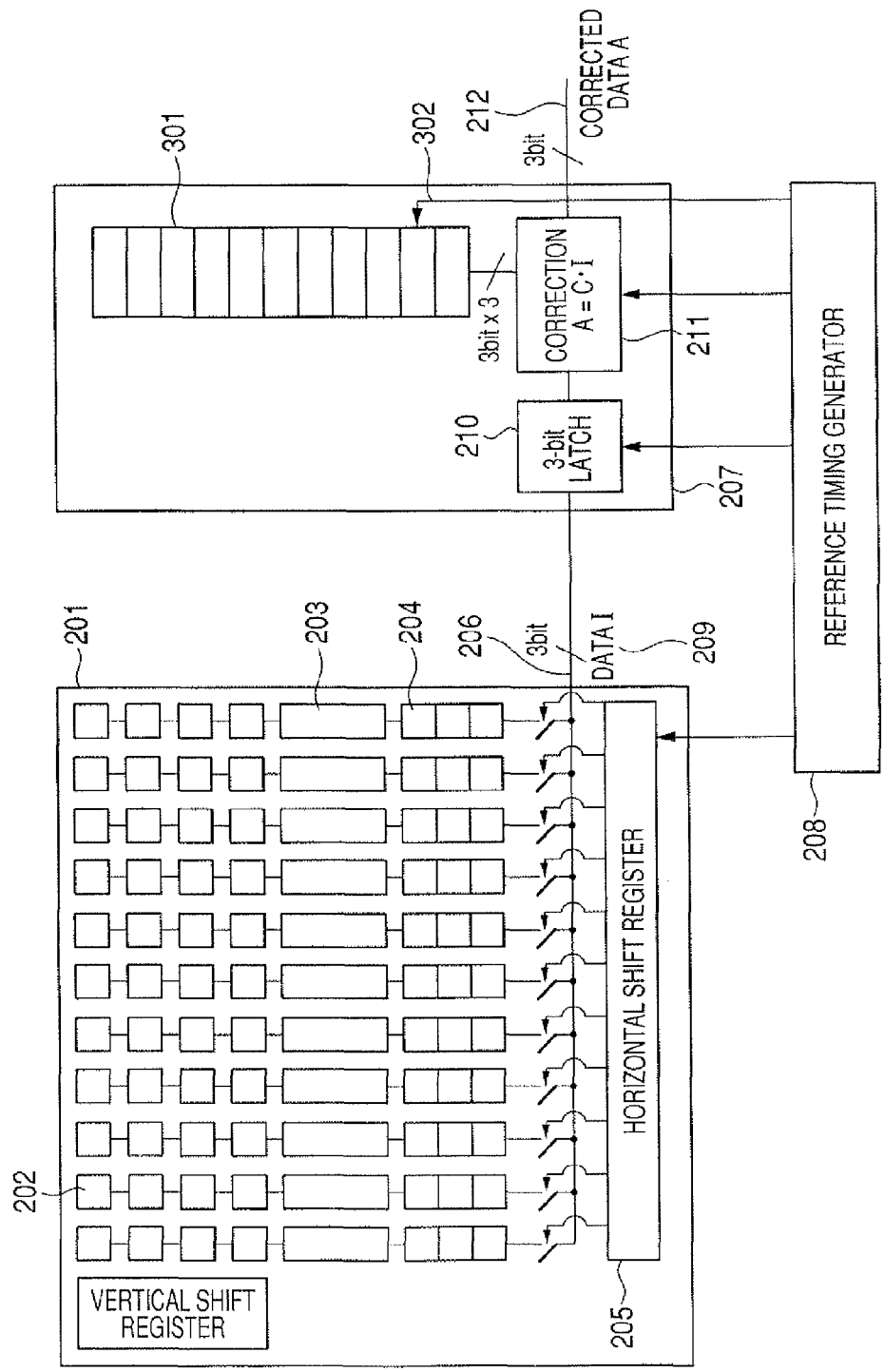
FIG. 3 is a view illustrating a configurational example of an image pickup device having a column ADC according to a second embodiment of the present invention.

FIG. 3 shows a configurational example of the image pickup device having a column ADC according to a second embodiment of the present invention for solving the foregoing problems, and has the same reference numerals for the same portions as those in FIG. 2. A different point from those in he first embodiment is an added correction factor memory 301, and the memory 301 operates with a control signal 302 input from the reference timing generator 208.

The correction factor memory 301 can store correction factors of the same quantity as that of ADC 203 in each column. The correction unit 211 corrects differential nonlinear errors for each column based on the correction factors of ADC 203 in a corresponding column of correction factors of the same quantity as that of ADC 203 in each column.

FIG. 4 is a timing chart illustrating operation of the circuit in FIG. 3. Reference numeral 401 inputs a sensor output converted by the first analog-to-digital converter of the sensor 201 after synchronization with the reference timing clock and, at the same time, loads a correction factor vector 402 for correcting an output of the first analog-to-digital converter from the correction factor memory 301 into the correction unit 211. At the next reference timing clock, calculation is completed to obtain a corrected output A at a timing 403.

The correction unit 211 inputs the second sensor output 1 and a correction factor vector C for the next correction at respective timings 404 and 405 after completion of correction in the first column.

In this embodiment, the correction unit 211 inputs a correction factor from the correction factor memory 301 in synchronization with an output period of the image sensor 201.

Additional advantage of this embodiment is as follows: First, correction with correction factors corresponding to each column permits more exact correction of differential nonlinear errors for each column, thus having achieved higher precision. At this time, the correction factors can improve correction precision by using a factor extracted by an actual CMOS sensor.

Moreover, by taking the correction unit 211 as a single one and updating correction factors in synchronization with pixels, an area of a calculation unit can be significantly reduced and exact correction can be attained in synchronization with an output of the image sensor.

(Third Embodiment)

Figure 5A:
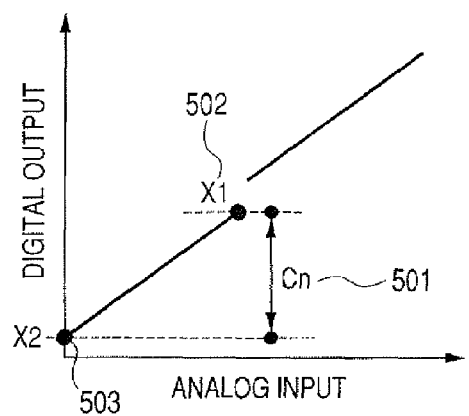
FIGS. 5A, 5B and 5C are views illustrating I/O characteristics of an analog-to-digital converter to be corrected according to a third embodiment of the present invention.
Figure 5B:
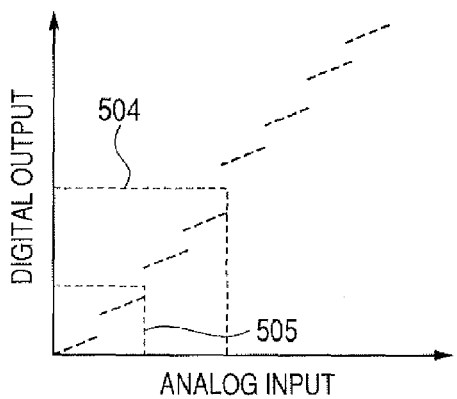
Figure 5C:
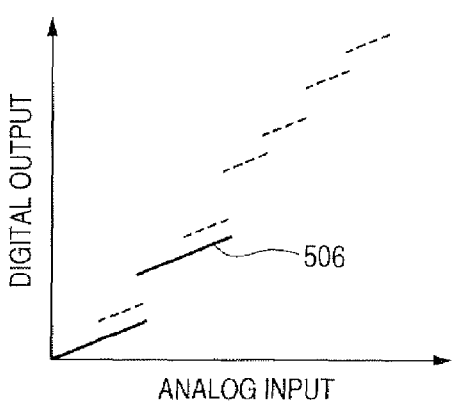
Figure 6:
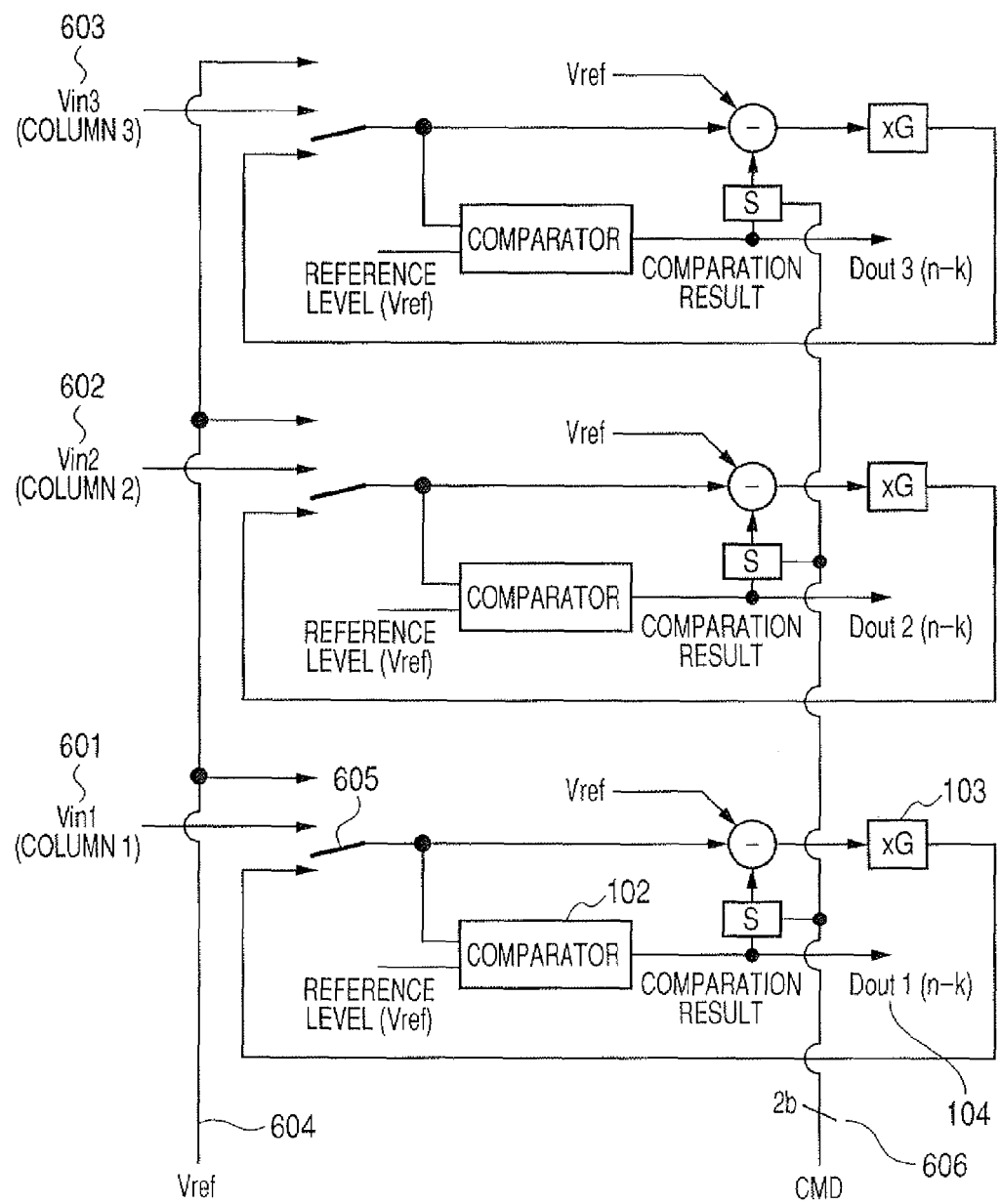
FIG. 6 is a view illustrating a configurational example of a column ADC capable of obtaining a correction factor according to the third embodiment of the present invention.

In a third embodiment according to the present invention, a correction factor acquirement unit for acquiring the correction factor from an actual CMOS image sensor will be described below. FIGS. 5A to 5C illustrates I/O characteristics of an analog-to-digital converter to be corrected according to this embodiment. FIG. 6 illustrates a configurational example of a column ADC capable of obtaining a correction factor according to this embodiment. The same portions as those in FIGS. 1A and 1B have the same numerals.

FIG. 5A illustrates an example when an erroneous code occurs just in the center of an input dynamic range. The following is a method for determining one element Cn of the correction factor as indicated by reference numeral 501. FIG. 6 illustrates an example of a correctable column ADC circuit capable of determining Cn.

First, an input is provided with a path for inputting signals 601, 602, 603 from a column and a path for circulating signals themselves, as well as a path for inputting a reference voltage Vref indicated by reference numeral 604. Accordingly, a switch 605 is changed so as to be selected from three types of signals.

Next, as a command signal 606, a 2-bit command signal CMD is prepared to forcibly indicate externally and overwrite comparison results of designating presence of subtraction against the reference voltage Vref. In the contents of the command signal CMD, 1-bit is used to instruct need of adopting a comparison result and another 1-bit is used to perform designation of a comparison result at the adoption as 0 or 1.

Operation of this circuit will be described below. First, forcibly input the reference voltage Vref. At this time, forcibly give an instruction of a comparison result as 0 to a command signal CMD. Upon the above operations, the conversion result of each ADC indicates a value X1 of a point 502 in FIGS. 5A to 5C. The X1 for all columns is first retained. Next, the comparison result is forcibly taken as 1 and AD conversion is performed again. Upon the AD conversion, an output of each ADC becomes a value corresponding to a value X2 of a point 503.

By subtracting this X2 from X1 retained just now, a value corresponding to Cn in each column can be obtained.

An actual erroneous code occurs all over as illustrated in FIG. 5B. However, if a correction factor of I/O characteristics in which an erroneous code exists only in the center can be determined, elements of correction factors are determined in order from lower order bit, thus achieving all elements of correction factors. The reason will be described below.

In an analog-to-digital converter showing characteristics as illustrated in FIG. 5B, first, a correction factor of lower order bit is determined. An area enclosed by a box 504 is an I/O characteristic of lower order bit, but jumps exist in any other area than the central portion. When further going down to lower order bit recursively, the I/O characteristics result in those where an erroneous code occurs only in the center as indicated by 505.

One element C0 of a correction factor is first determined for this area, and correction of higher order bit is performed recursively based on C0 to obtain I/O characteristics of 506 illustrated in FIG. 5C. Upon acquirement of a correction factor of lower order bit, the correction factor of higher order bit is calculated based on a corrected lower order bit, thus obtaining all correction elements.

As described above, the image sensor 201 has a correction factor acquirement unit for acquiring correction factors using analog-to-digital converters in FIG. 6.

An example of correction of a circulation type of column ADC is illustrated herein. It is obvious that advantages of this embodiment can be obtained in the same way for others such as various types of column ADC forms and correction algorithms.

For applications which is at a timing of this correction but do not require severe precision, correction factors are initially determined once, such as at delivery from a factory, and the values are used for subsequent photographing.

For applications which are apt to be affected by temperature changes or secular changes, correction factors are set so as to be acquired by the time of starting the first photographing after turning on an apparatus switch. In other words, the correction factor acquirement unit acquires correction factors at the initialization of an image pickup device.

The correction factor acquirement unit, having a vertical blanking period or a period when pixel outputs are not required between frames or fields in updating correction factors during the operation, such as in photographing moving images, may perform correction operation during the above period to acquire correction factors again. In photographing still images, correction factors may be acquired before photographing. If the time of acquiring correction factors is effectively set at zero, it is sufficient for the correction factor acquirement unit to acquire correction factors while a shutter is opening, that is, during carrier storage period by photoelectric conversion of the image sensor 201 performing exposure of a subject.

The correction factors which have been acquired again, for example, all existing correction factors are overwritten. Under an environment where external disturbance is estimated, a correction factor may have a possibility of having an error due to sudden external disturbance. Accordingly, it is good to update the correction factor by taking weighted averaging with an existing value without overwriting all correction factors at a time. The weighted averaging becomes a design parameter of how a newly acquired correction factor is reliable.

In other words, the correction factor memory 301 updates a correction factor in which a newly acquired correction factor and a correction factor in the correction factor memory 301 are weighted-averaged.

Calculation required to acquire a correction factor is performed by the digital signal processing unit 207 alone, by which advantages such as high-speed start and load relief of a processing circuit can be achieved. That is, the digital signal processing unit 207 has a correction factor calculation unit for calculating correction factors based on output digital signals of the image sensor 201.

As described above, for example, in acquiring a correction factor after turning on an apparatus switch, in most cases, main computers for apparatuses execute other processing for system start. Calculation of correction factors based on the acquired output from the sensor 201 adds additional calculation to a sequence at the time of start, thus causing relative long start time.

Even during a vertical blanking period, main computers perform work for determining photographing conditions of the next frame. To calculate a correction factor during the period, the number of lines to be read must be reduced for longer vertical blanking period.

In the above two cases, application of this embodiment can eliminate processing with a main computer for attainment of advantages without need of increasing the time necessary until start, if a correction factor can be calculated locally between the image sensor 201 and the digital signal processing unit 207.

What correction factors are different in each column means that its implications are different, for example, if 3-bit AD conversion obtains a maximum digital code of (1, 1, 1). An internal product of data (1, 1, 1) from pixels and correction factor (C3, C2, C1) becomes C3+C2+C1, that is, a total of elements of the correction factors. Accordingly, different correction factors for each column causes different maximum of correction values for each column. This causes photoresponse non-uniformity, thus having an adverse effect on image quality.

Accordingly, the correction unit 211 normalize the corrected signal by multiplying a total sum of constructional features of the correction factors used for the correction by a factor for keeping the total sum constant, by which photoresponse non-uniformity can be corrected. Otherwise, by storing the correction factor normalized so that a total sum of constructional features may be constant in the correction factor memory 301, similar advantage can be achieved. In addition to the correction unit 211, an photo response non-uniformity correction unit may be provided to perform photo response non-uniformity correction. The photo response non-uniformity refers to percentage of a degree that if the same quantity of light is input, outputs of all pixels should become uniform, but will not become uniform due to variations in sensitivity of pixels themselves or in gain of read-out system. In this embodiment, even if the same voltage is input by an analog-to-digital converter, the same digital value will not be output. Accordingly, reaction to the light might become uneven without correction. On the other hand, this embodiment can correct PRNU.

The correction unit 211 may be configured so as to normalize a corrected signal for a constant output dynamic range. As means for keeping the output dynamic range constant, this embodiment uses a device of calculating factors for normalization based on correction factors, which is not limited to this methodology. For example, a methodology may be used which acquires digital outputs when input into all column ADCs and prepares correction factors so as to keep the acquired outputs constant.

(Fourth Embodiment)

Figure 7:
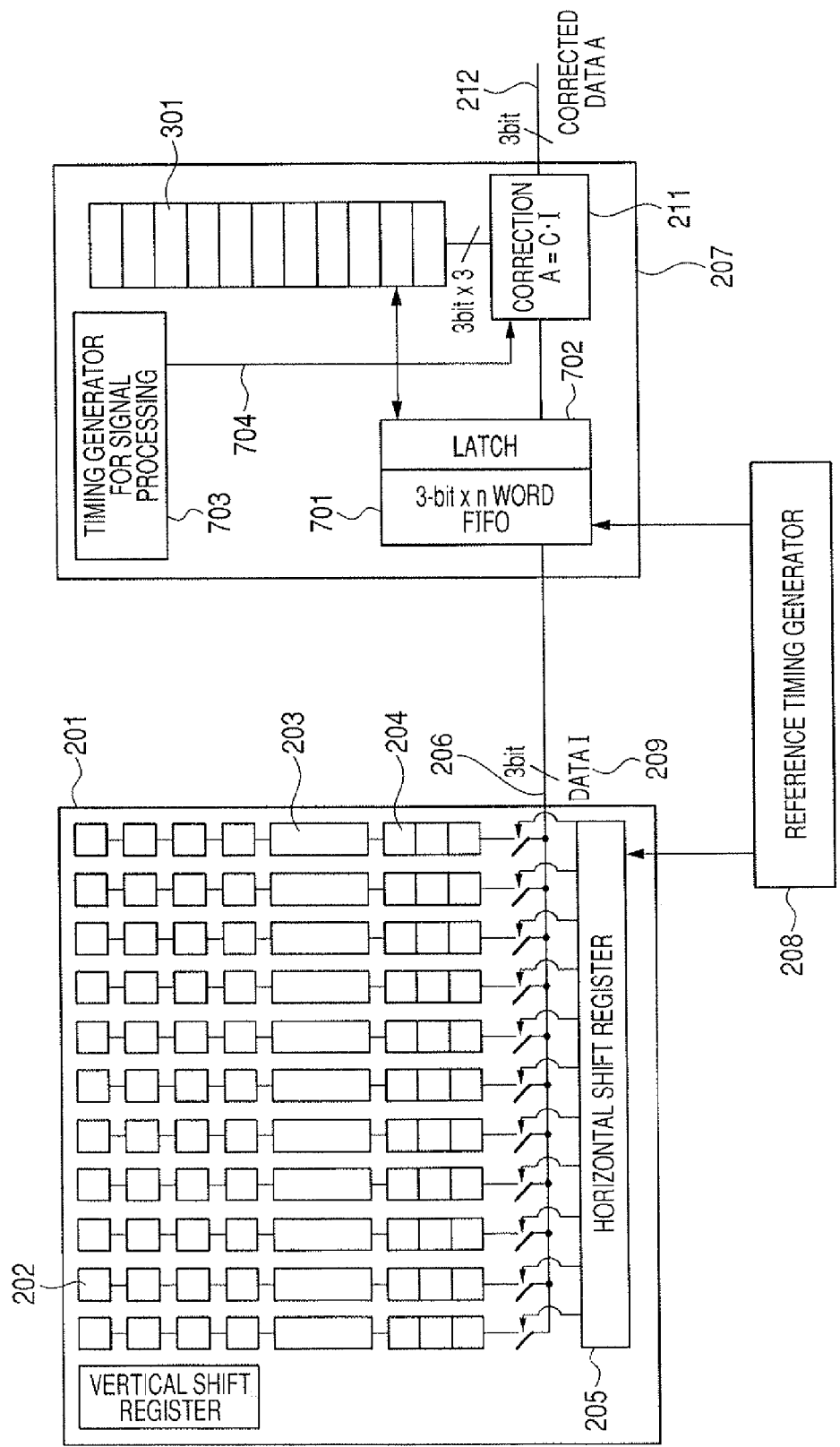
FIG. 7 is a view illustrating a configurational example of an image pickup device according to a fourth embodiment of the present invention.

FIG. 7 is a view of a configurational example of an image pickup device according to a fourth embodiment of the present invention. The same portions as those in FIG. 3 have the same numerals/characters. In this embodiment, a concrete design example of the digital signal processing unit 207 will be described below. FIG. 7 illustrates an example of a circuit diagram when a clock of the digital signal processing unit 207 and a clock of a pixel data output from the CMOS image sensor 201 are operated with a different clock.

Reference numeral 701 denotes a FIFO buffer capable of storing 3-bit data by several words and is provided between the image sensor 201 and the correction unit 211. The FIFO701 inputs a reference timing pulse of the reference timing generator 208 and synchronously loads digital data of the image sensor 20.

The data of the FIFO701, after the timing thereof is adjusted by a latch 702, is output to the correction unit 211. At that time, the correction unit 211 uses a clock 704 from the signal processing timing generator 703 for timing adjustment. An action of the correction unit 211 is almost the same as for the second embodiment, except that a clock used for synchronization is from the signal processing timing generator 703.

In this embodiment, the correction unit 211 inputs a correction factor from the correction factor memory 301 in synchronization with an output period of the FIFO701.

Additional advantage of this embodiment is as follows: For example, a retaining memory 301 and the correction unit 211 are described as a dedicated block, however, in supposing mounting on hardware, a general-purpose arithmetic device or a main storage may be used. In that case, it becomes difficult to always occupy the general-purpose section only for correction function implementation.

In such a case, if it is possible to make FIFO701 retain data from pixels, correction is not required while the data is being retained. Accordingly, assignment of other role can be made during the period by the arithmetic device or the main storage.

Processing data stored in FIFO701 requires higher-speed correction than a reference timing pulse, however, use of another high-speed clock for signal processing like this embodiment would implement high-speed and exact correction with positive synchronization.

This embodiment uses FIFO701, however, for example, random access memory (RAM) such as frame memory or line memory may be used in place of FIFO701. In that case, the correction unit 211 synchronizes with a reading period of a random access memory and inputs a correction factor from the correction factor memory 301.

(Fifth Embodiment)

Figure 8:
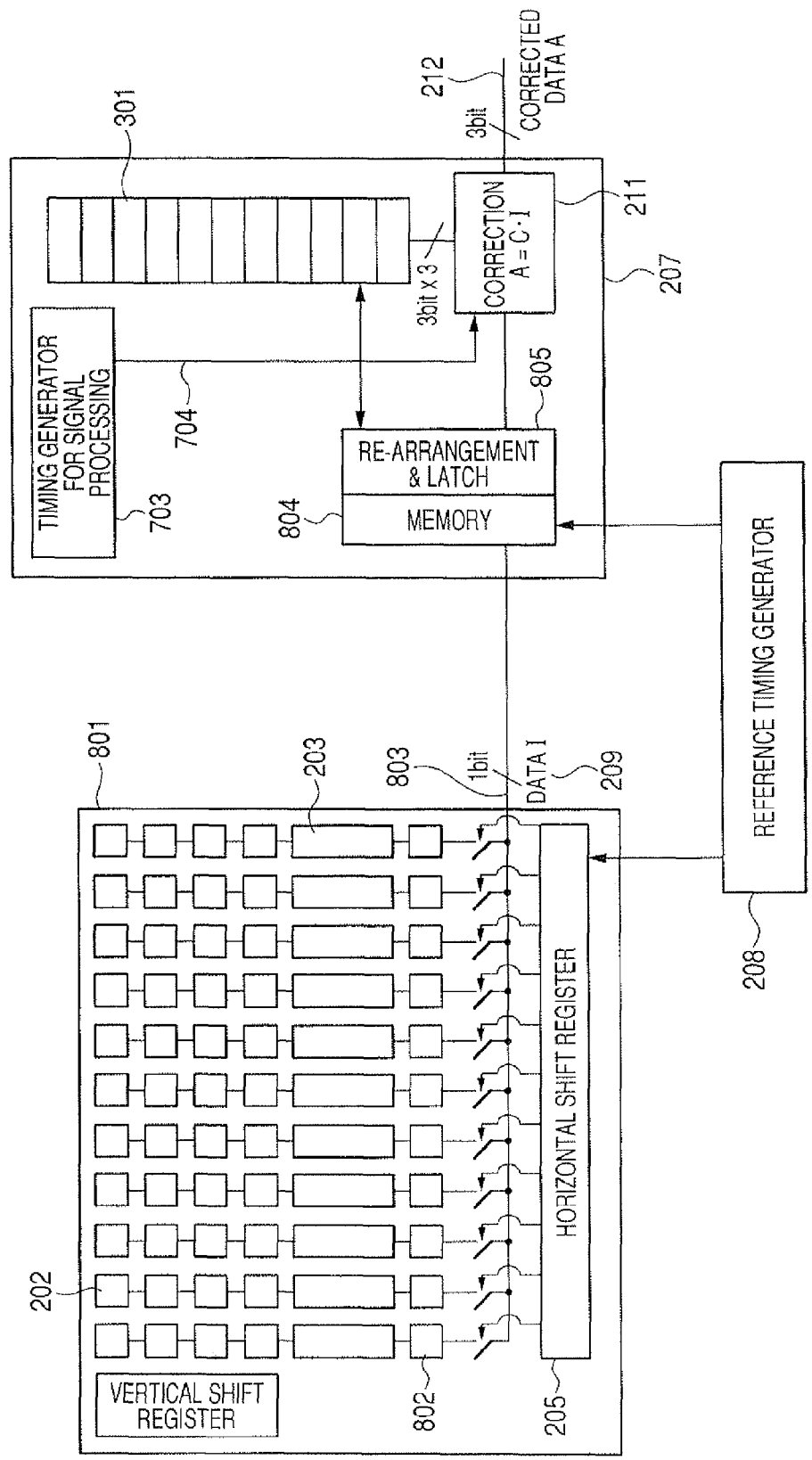
FIG. 8 is a view illustrating a configurational example of an image pickup device according to a fifth embodiment of the present invention.

Next, a fifth embodiment of the present invention by use of an image sensor implementing a special seal digital output will be described below. FIG. 8 illustrates an example of an image pickup device including an image sensor 801 with built-in column ADC and the digital signal processing unit 207, implementing a serial digital output according to the fifth embodiment of the present invention. The same portions as those of the above-mentioned embodiment have the same numerals/characters.

The image sensor 801, including a memory 802 of 1-bit as well as the width of a data output terminal 803 to the outside being 1-bit, is different from the image sensor 201 of the above-mentioned embodiment, which includes the memory 204 of 3-bit in each column as illustrated in FIGS. 2, 3 and 7.

In a circulation type of column ADC, sequential outputs are made from the higher order bit of each bit. Accordingly, the sensor 801, upon conversion completion of a bit, performs sequential outputs without waiting for the results of all bits. In other words, the sensor 801 outputs digital signals sequentially from a fixed higher order bit in each column.

Figure 9:
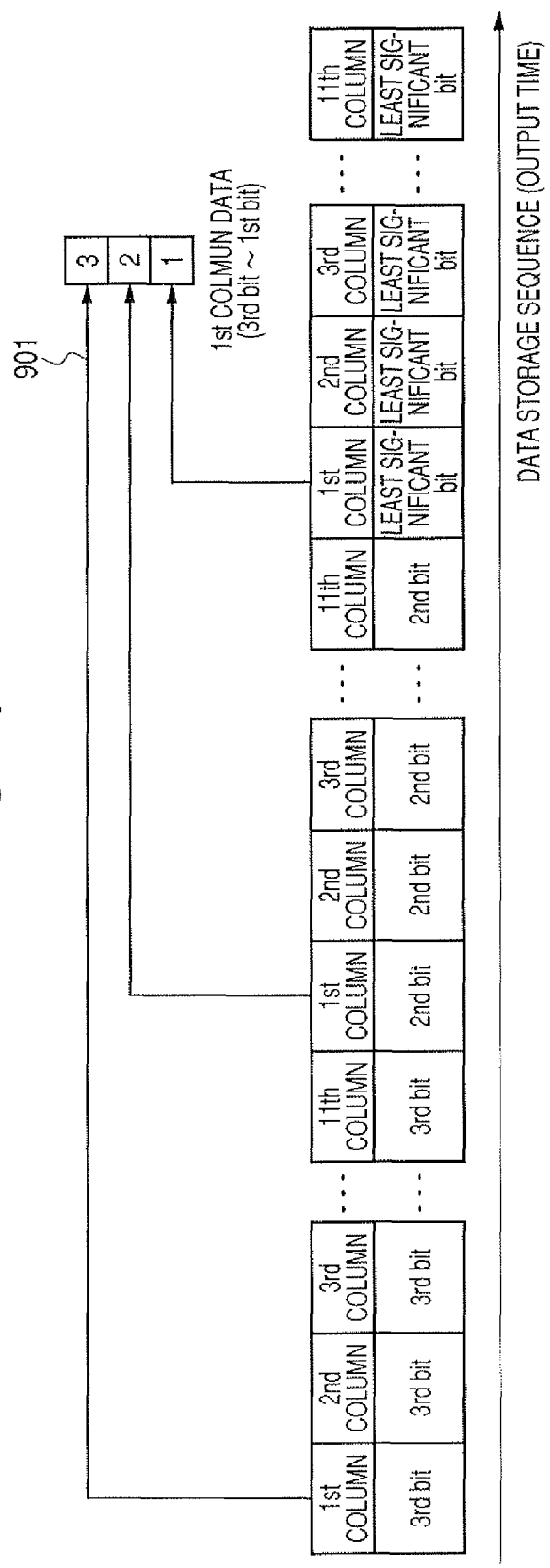
FIG. 9 is a view illustrating a sequence of data storage.

The digital signal processing unit 207 retains its serial data output in a memory 804. However, data from the image sensor 801 is stored in the memory 804 in such an order as shown in FIG. 9, therefore, no exact correction will be performed if each 3-bit is output to the correction unit 211 as it is. A reallocation unit 805, as illustrated by reference numeral 901, extracts data of bit belonging to the same column from the memory 804, rearranges the data in an correct order from the higher order bit to lower order bit and outputs the signals to the correction unit 211. For example, the reallocation unit 805 extracts data of the 3rd bit, 2nd bit and lowest order bit of one column from the memory 804 and outputs the data to the correction unit 211. That is, the reallocation unit 805 reallocates output digital signals of the image sensor 801 to signals for each pixel and outputs the signals to the correction unit 211.

Additional advantage of this embodiment is as follows: The image sensor 801 is set so as to output to the outside immediately after conversion from the higher order bit, thus reducing the volume of the memory 802 required by the image sensor 801 as well as a chip area. In such an image sensor 801, by fitting a reallocation unit onto the digital signal processing unit 207, proper data can be output to the collection unit 211 to permit attainment of exact collection.

(Sixth Embodiment)

Figure 10:
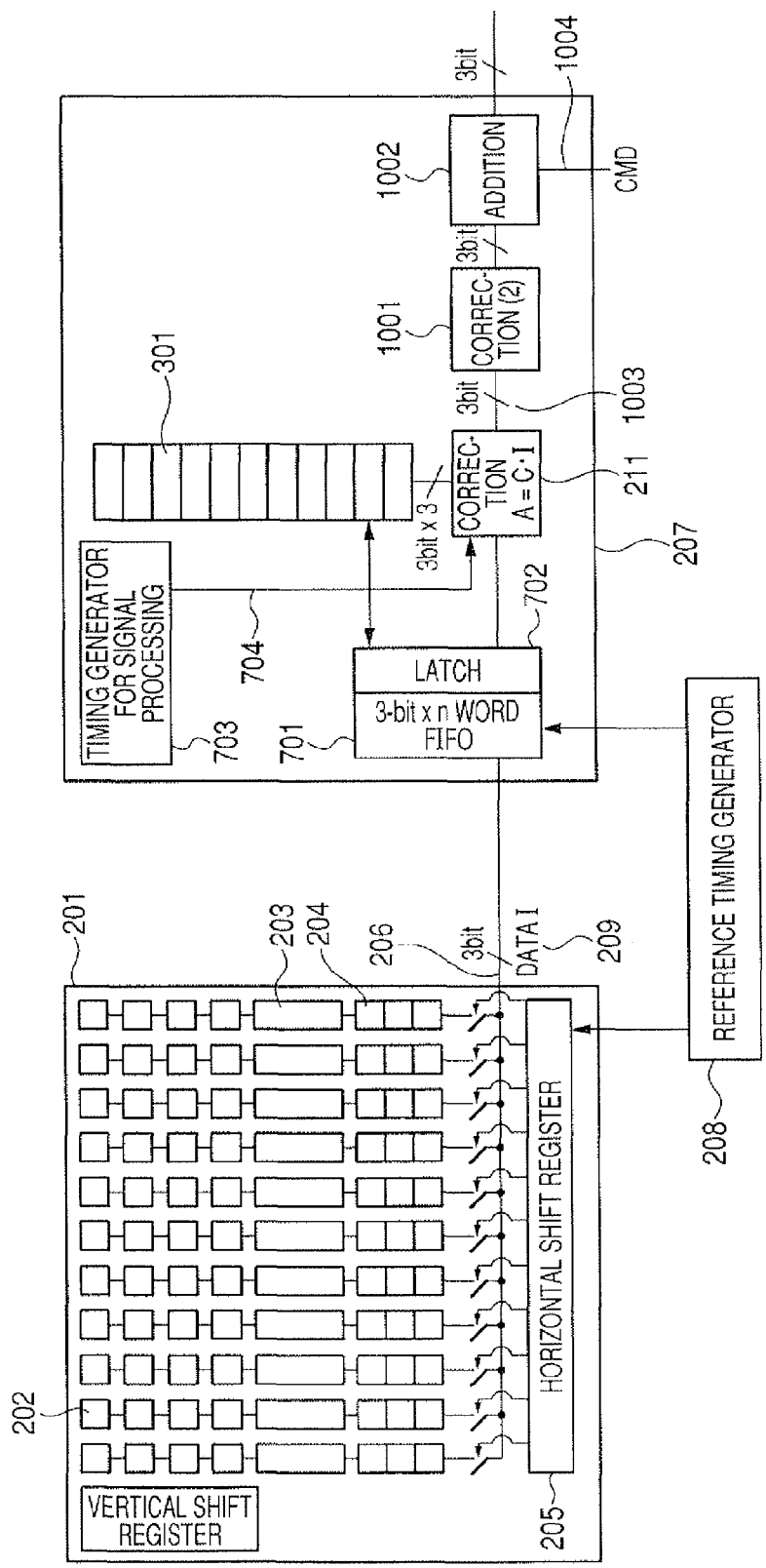
FIG. 10 is a view illustrating a configurational example of an image pickup device according to a sixth embodiment of the present invention.

FIG. 10 is a view of a configurational example of an image pickup device according to a sixth embodiment of the present invention. The same portions as those in FIG. 7 have the same numerals/characters. This image pickup device is capable of correcting those except differential nonlinear errors.

Reference numeral 1001 denotes a second correction unit for correcting various sensor characteristics except differential nonlinearity. Reference numeral 1002 denotes a pixel additional processing unit for adding adjacent pixels to each other after correction.

The correction unit 211, after creating corrected data 1003, outputs the data to a second correction unit 1001. The second correction unit 1001 is, for example, a fixed pattern noise removal unit for removing fixed pattern noise found in the horizontal direction from digital signals corrected by the correction unit 211, and a horizontal shading correction unit for performing horizontal shading correction. Otherwise, the second correction unit 1001 is, for example, a fixed pattern noise removal unit for removing fixed pattern noise found in the vertical direction from digital signals corrected by the correction unit 211, and a vertical shading correction unit for performing vertical shading correction. Then, a pixel additional processing unit 1002, upon inputting an instruction of addition with an addition instruction signal 1004, adds data adjacent pixels to each other to lower data rate for output.

In other words, the pixel additional processing unit 1002 adds a plurality of pixel digital signals to digital signals corrected by the correction unit 211 and the second correction unit 1001.

Additional advantage of this embodiment is as follows: Performing shading correction, fixed pattern noise correction and pixel data addition for data before correction of differential nonlinear error is calculation for improper data, thus causing the results to have errors. Even if correction of differential nonlinear errors described in FIG. 2 is performed for such erroneous results, exact results cannot be obtained.

According to this embodiment, by performing other various corrections and/or weighted addition processing for highly accurate data with corrected differential nonlinear error, exact shading correction, fixed pattern noise correction and addition processing can be performed.

As addition processing, for example, breaking down by colors may be performed so that the same colors are added. In addition, weighted addition may be performed for moire relief processing. BY adding line memory for several lines to an addition block, addition processing may be performed for two-dimensional kerne. The advantages of this embodiment do not depend upon types of the addition.

(Seventh Embodiment)

Figure 11:
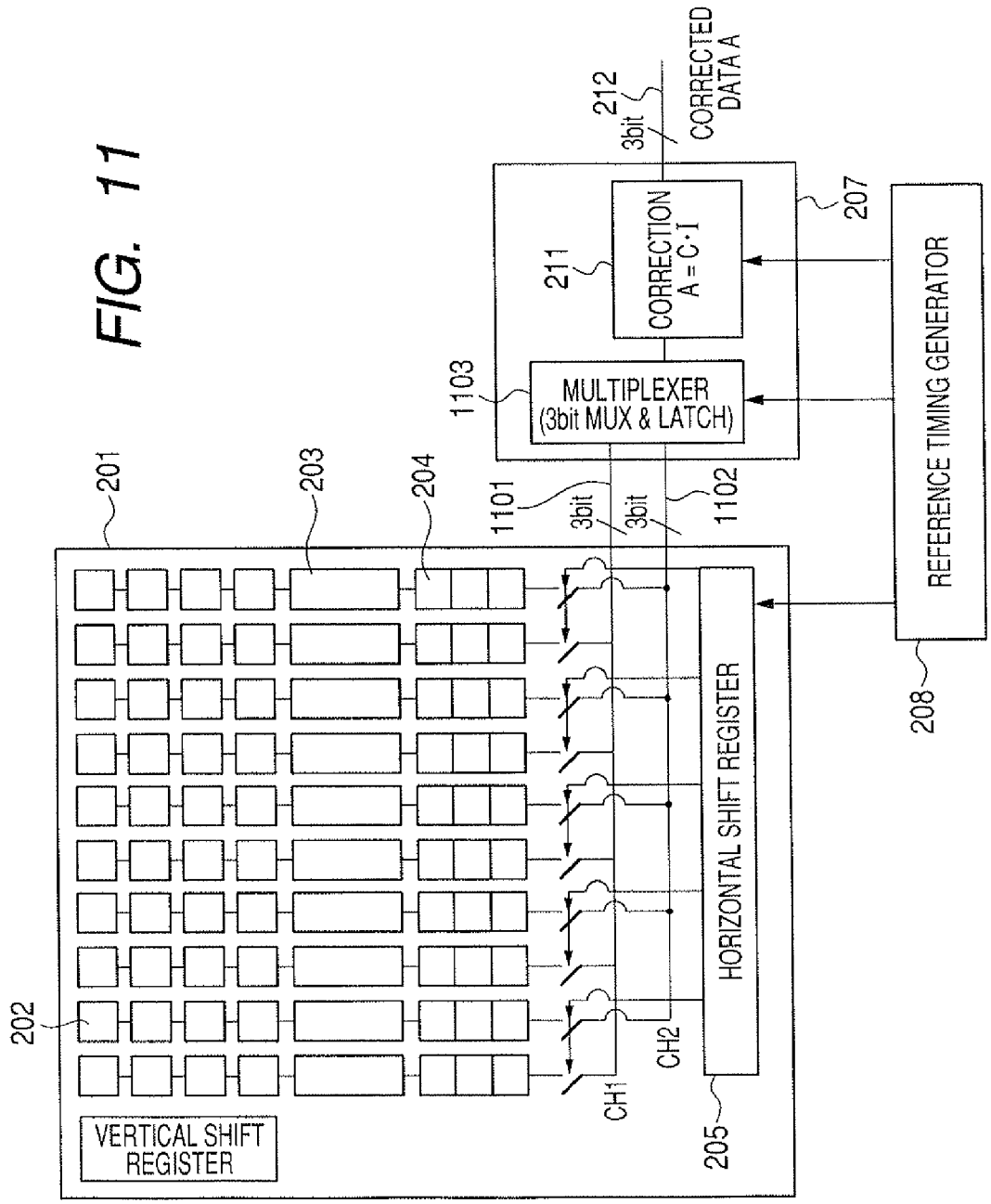
FIG. 11 is a view illustrating a configurational example of an image pickup device according to a seventh embodiment of the present invention.

FIG. 11 is a view of a configurational example of an image pickup device according to a seventh embodiment of the present invention. The same portions as those in FIG. 2 have the same numerals/characters. For this embodiment, a combination of the image sensor 201 having a plurality of output channels and the digital signal processing unit 207 will be described below. In this embodiment, analog-to-digital converters in every other column are connected to other independent channels respectively. Even-numbered channels are connected to a first channel 1101 and odd-numbered channels are connected to a second channel 1102. The image sensor 201 outputs digital signals of multi-channels 1101 and 1102.

The two channels 1101 and 1102, after being multiplexed by a multiplexer 1103, are connected with a single correction unit 211. The multiplexer 1103 outputs 3-bit digital data output with the same phase from the multi-channels 1101 and 1102 to the correction unit 211 with the phase shifted.

One of advantages of this embodiment is that hardware can be more compact because only a single correction unit 211 is enough even if a plurality of channels exist. Moreover, in this embodiment, an example of multiplexing the two channels 1101 and 1102 into one channel is described, but even in the case of two or more channels, the same advantage can be achieved.

This embodiment does not limit the location of the multiplexer 1103, that is, on which side of the image sensor 201 or the digital signal processing unit 207 the multiplexer 1103 should be located. This is because such positioning is not required in arranging the image sensor 201 and the digital signal processing unit 207 on an identical semiconductor substrate.

If the multiplexer 1103 is possible to locate on the image sensor 201 side, this will yield an additional advantage of reduction in the number of wires between the image sensor 201 and the digital signal processing unit 207.

The digital signal processing unit 207 is generally produced by a more advanced manufacturing process than the image sensor 201. Accordingly, if the multiplexer 1103 is located on the digital signal processing unit 207, an advantage that the multiplexer 1103 requiring high-speed operation can be easily disposed within an identical chip. Especially, the number of channels of the multiplexer 1103 will become at least two and, if the switching speed requested to the multiplexer 1103 becomes higher, this advantage will not be negligible.

(Eighth Embodiment)

In a eighth embodiment of the present invention, changes of the amplification factor of residue will be described below. A residue signal used herein refers to a signal obtained by subtracting a reference level from an analog signal after completion of each step of AD conversion.

Figure 12:
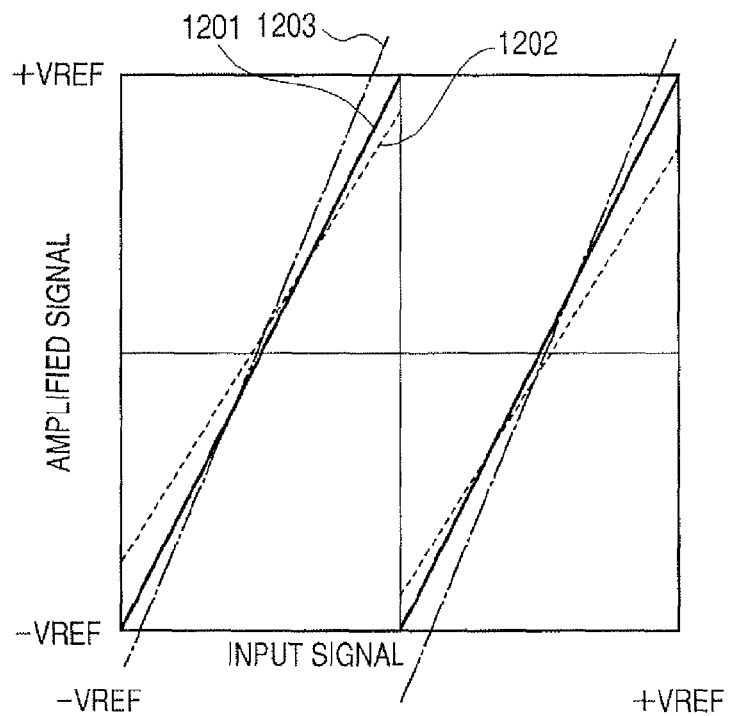
FIG. 12 is a graph of RTF characteristics illustrating a state of amplification of residue according to a eighth embodiment of the present invention.

FIG. 12 is a graph of residue transfer function (RTF) characteristics showing an amplification state of residue according to an eighth embodiment of the present invention. The graph illustrates voltages input into an analog-to-digital converter on the lateral axis and how the inputs are converted and returned to inputs of a multi-step analog-to-digital converter again on the longitudinal axis.

Reference numeral 1201 denotes RTF characteristics in an ordinary circulation type of analog-to-digital converter. If inputs are made from −VREF to +VREF, residue is amplified to a range from −VREF to +VREF like an input dynamic range after processing based on comparison results.

In this embodiment, RTF characteristics are set so that residue is amplified to less than the input dynamic range in designing, as indicated by 1202.

Figure 13:
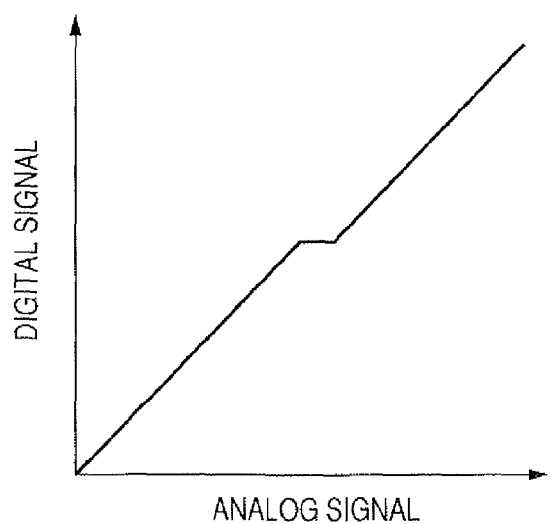
FIG. 13 is a graph illustrating a relationship between analog signals and digital signals.
Figure 14:
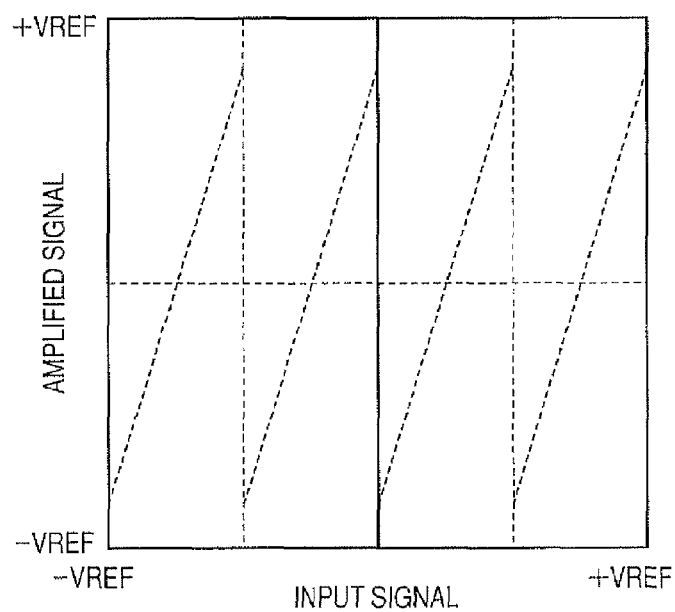
FIG. 14 is a graph illustrating a relationship between input signals and amplified signals.
Figure 15:
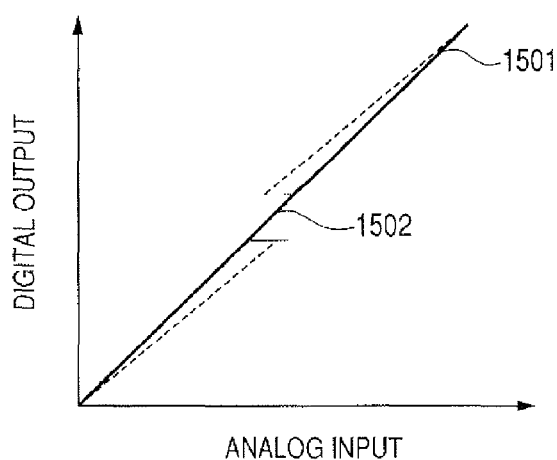
FIG. 15 is a schematic diagram of I/O characteristics of an AD converter.
Figure 16:
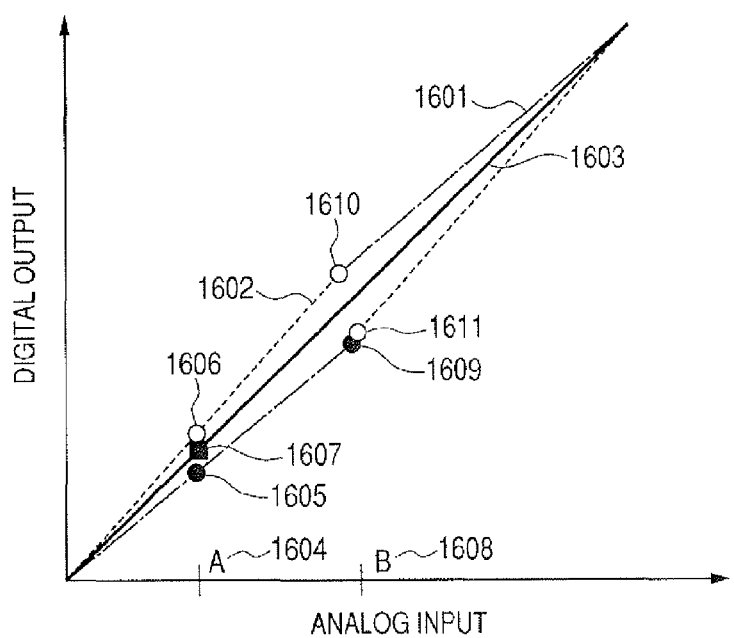
FIG. 16 is a graph illustrating a relationship between analog input and digital output.

The advantage of the eighth embodiment of the present invention will be described below. Especially, such an analog-to-digital converter as to be inserted into a column of the image sensor even if produced like 1201 at the time of design avoidably has large variations in manufacturing than ordinary analog-to-digital converters. Under such a condition, if residue after amplification exceeds the input dynamic range like 1203, an overlapped code which makes different analog values adapted to the same digital values occurs as illustrated in FIG. 13, thus making correction by a digital circuit impossible.

Accordingly, by devising so as not to show RTF characteristics as indicated by 1203 even in the worst case in consideration of manufacturing variations in designing, no overlapped codes are generated, thus always enabling digital correction.

In this embodiment, the analog-to-digital converters are set so that the dynamic range of the residue is under the input dynamic range thereof, after residue after completion of each step is voltage-amplified.

The possible cause of deviation of RTF characteristics is not only manufacturing variations. Especially, in the circuit diagram of the analog-to-digital converter as illustrated in FIG. 6, such a deviation is similarly found in a configuration using a single end type of operational amplifier 103 in place of full-differential type of operational amplifier 103. In this case, a voltage after amplification of residue exceeds the input dynamic range because of clock feed through occurring during hold or output offset voltage of an amplifier. Application of this embodiment permits digital correction, especially in a case where layout conditions are strict and design is difficult to implement as a highly precise analog circuit like an image sensor.

Moreover, as additional advantage, the single end type generally requires layout width half that of a full differential type. An advantage that layout on an image sensor is easy can be achieved.

Design of RTF characteristics in view of manufacturing variations in this way is not limited to only the circulation type. For example, in the case of a 4-bit analog-to-digital converter, a double-integration type analog-to-digital converter with the reduced number of comparison steps such as a conversion of individual upper and lower two bits, or a lamp type analog-to-digital converter with the reduced number of comparison steps can perform digital correction. For these analog-to-digital converters, it is sufficient to perform design so that residue after amplification may not exceed the input dynamic range including manufacturing variations, clock feed through and output offset at amplification. This enables produce analog-to-digital converters capable of digital correction without generating overlapped codes.

As described above, the first to the eighth embodiments provides higher-speed correction than a case where twice analog-to-digital conversion result is used by performing correction for an output digital signal of an image sensor. Connection of a circuit for twice analog-to-digital conversion needs no switching. This can eliminate use of excess switches or analog devices as much as possible. Furthermore, erroneous correction can be prevented for appropriate correction.

Any of the foregoing embodiments describes only concrete examples in implementing the present invention, by which the technical field of the present invention must not definitely interpreted. In other words, the present invention may be implemented in various forms without departing from technical idea or main features thereof. Moreover, embodiments, a configuration having analog-to-digital converters in each column is described, which is not limited to this configuration. For example, analog-to-digital converters may be provided for each plurality of columns. It is sufficient that a plurality of analog-to-digital converters are used as an image pickup device. Furthermore, the present invention directly corrects differential non-linear errors, but concurrently can correct integrated nonlinear errors as well.

This application claims priority from Japanese Patent Application No. 2006-167750 filed on Jun. 16, 2006, which is hereby incorporated by reference herein.

The invention claimed is:

1. An imaging pickup device comprising:
an image sensor having a pixel region with pixels including photoelectric conversion elements arranged in a two-dimensional form, and a plurality of analog-to-digital converters converting analog signals from pixels to digital signals by determining a higher part of a digital signal including the most significant bit as a first step down to a lower part of the digital signal including the least significant bit, the pixel region and the plurality of analog-to-digital converters being arranged on a common semiconductor substrate, and the image sensor being adapted to output the digital signal formed by each of the plurality of the analog-to-digital converters; and a first correction unit that receives the digital signals output from the image sensor and for correcting nonlinear errors of the digital signal formed by analog-to-digital converters of the plurality of analog-to-digital converters based on a correction factor corresponding to each of the analog-to-digital converters.

2. The image pickup device according to claim 1, further comprising a second correction unit configured to subject the digital signal to at least one of a shading correction, a fixed pattern noise correction and an addition of the digital signals, after the correcting the nonlinear error of the digital signal.

3. The image pickup device according to claim 2, wherein the image pickup device includes a plurality of pixels, and the addition of the digital signals is performed so that the digital signals from the pixels of the same colors are added.

4. The image pickup device according to claim 1, wherein the image sensor comprises pixels arranged in rows and columns, each column of the pixels comprising one of the plurality of analog-to-digital converters, wherein a number of correction factors is provided that corresponds to the number of columns, and wherein the first correction unit is adapted to correct the nonlinear errors for each column, based on the correction factor of the analog-to-digital converter in the corresponding column, the correction factor being one of a plurality of sets of correction factors of the same number as those of the analog-to-digital converters in each column.

5. The image pickup device according to claim 1 or 4, wherein the image sensor has a correction factor acquirement unit for acquiring the correction factors with the analog-to-digital converters.

6. The image pickup device according to claim 1, wherein the image pickup device further has (i) a correction factor memory for storing the correction factors and the first correction unit is adapted to input the correction factors from the correction factor memory synchronously with an output period of the image sensor, (ii) the correction factor memory for storing the correction factors and a FIFO buffer or a random access memory provided between the image sensor and the first correction unit, and the first correction unit is adapted to input the correction factors from the correction factor memory synchronously with an output period of either of the FIFO buffer and the random access memory.

7. The image pickup device according to claim 1, wherein each of the correction factors comprises a plurality of digital codes, and the first correction unit normalizes the corrected signal by multiplying a total sum of digital codes of each of the correction factors by a factor for keeping the total sum constant.

8. The image pickup device according to claim 1, wherein each of the correction factors comprises a plurality of digital codes, and the image pickup device further includes a correction factor memory that stores the correction factor normalized so that a total sum of elements digital codes of each of the correction factors is constant.

9. The image pickup device according to claim 1, wherein the first correction unit is adapted to normalize the corrected signal for a constant output dynamic range.

10. The image pickup device according to claim 1, further including a second correction unit for correcting at least one of fixed pattern noise, horizontal shading, vertical shading and photoresponse non-uniformity against digital signals corrected by the first correction unit, and a pixel additional processing unit for adding a plurality of pixel digital signals corrected by the second correction unit.

11. The image pickup device according to claim 1, further comprising a correction factor acquirement unit for acquiring the correction factors during any of image pickup device initialization, vertical blanking period and carrier storage period by photoelectric conversion of the image sensor.

12. The image pickup device according to claim 1, wherein the image pickup device further includes a correction factor memory for storing the correction factor and the correction factor memory is adapted to update and store a correction factor in which a newly acquired correction factor and a correction factor in the correction factor memory are weighted-averaged.

13. The image pickup device according to claim 1, wherein the image sensor is adapted to output digital signals sequentially from determined higher order bits in each column and further includes a reallocation unit for allocating the output digital signals of the image sensor to signals for each pixel and outputting the signals into the first correction unit.

14. The image pickup device according to claim 1, wherein the image sensor includes a multiplexer that outputs digital signals of multi-channels, further shifting a phase relative to digital signals of the same phase of the multi-channels and for outputting the signals to the first correction unit.

15. The image pickup device according to claim 1, wherein a residue signal refers to a signal obtained by subtracting a reference level from an analog signal after completion of each step of analog-to-digital conversion, wherein the analog-to-digital converters are set so that the dynamic range of the residue signal is under the input dynamic range thereof.

16. The image pickup device according to claim 1, wherein the image sensor has a pixel region with pixels including photoelectric conversion elements arranged in a two-dimensional form, the pixel region and the plurality of analog-to-digital converters being arranged on a common semiconductor substrate.

* * * * *